United States Patent [19]

Ibarra

[11] Patent Number: 6,119,097
[45] Date of Patent: Sep. 12, 2000

[54] SYSTEM AND METHOD FOR QUANTIFICATION OF HUMAN PERFORMANCE FACTORS

[75] Inventor: David Ibarra, South Jordan, Utah

[73] Assignee: Executing the Numbers, Inc., South Jordan, Utah

[21] Appl. No.: 08/978,532

[22] Filed: Nov. 26, 1997

[51] Int. Cl.$^7$ .................................................. G06F 15/18
[52] U.S. Cl. .................................. 705/11; 705/7; 705/32
[58] Field of Search .............................. 705/2, 7–11, 32; 340/309.4, 309.5, 309.15; 364/468.05; 707/100

[56] References Cited

U.S. PATENT DOCUMENTS

| | | | |
|---|---|---|---|
| 4,413,277 | 11/1983 | Murray | 705/11 |
| 4,583,280 | 4/1986 | Corrigan et al. | 29/563 |
| 4,625,086 | 11/1986 | Karino | 219/720 |
| 4,701,849 | 10/1987 | Elden | 705/11 |
| 4,847,791 | 7/1989 | Martin et al. | 702/178 |
| 4,899,292 | 2/1990 | Montagna et al. | 707/501 |
| 5,068,787 | 11/1991 | Pipella et al. | 705/32 |
| 5,121,319 | 6/1992 | Fath et al. | 700/83 |
| 5,212,635 | 5/1993 | Ferriter | 705/11 |
| 5,365,425 | 11/1994 | Torma et al. | 705/11 |
| 5,875,431 | 2/1999 | Heckman et al. | 705/7 |

OTHER PUBLICATIONS

Igbaria et al., "Organizational experiences and career success of MIS professionals and managers: An examination of race differences", from MIS Quarterly Journal, v16n4, pp. 507–529, Dec. 1992.

Buick et al., "An investigation of the current practices of in–house employee training and development within hotels in Scotland", from Service Industries Journal, v17n4, pp. 652–668, Oct. 1997.

Gunnigle "Human resource management in Ireland", from Employee Relations Journal, v14n5, pp. 5–22, 1992.

Wholey et al., "The case for performance monitoring", from Public Administration Review, v52n6, pp. 604–610, Nov. 1992.

*Primary Examiner*—James P. Trammell
*Assistant Examiner*—Cuong H. Nguyen
*Attorney, Agent, or Firm*—Morriss, Bateman, O'Bryant & Compagni

[57] ABSTRACT

A method and apparatus which enables a supervisor to quantify job performance characteristics. The method accomplishes job performance quantification and tracking of performance by a series of steps which include using an employee problem-solving worksheet provided on a computer display to identify objective standards for the employee, identify and assign at least one objective activity to the employee which should enable the employee to meet the objective standards, completing a monthly evaluation of the person to determine whether or not the objective activities are being accomplished, and if so, whether the employee is at least meeting the objective standards. If the objective standards are not being met, the objective standards are re-evaluated to determine if they are realistic, and if they are, then new activities are assigned which should enable the person to meet the original or modified objective standards.

31 Claims, 13 Drawing Sheets

| STANDARDS-CHECK-UP FROM THE NECK-UP ENTRY - PART1 | | | | | | | | | | |
|---|---|---|---|---|---|---|---|---|---|---|
| STD DESCRIPTION | | MINIMUM | EXPECTED | OUTSTAND | NAME | | | | | |
| 4. Achieve closing rate | | 8% | 10% | 12% | David Park | | | | | |
| to number of incoming | | | | | YEAR: 1997 | | | | | |
| phone calls at | | 4 PNTS | 7 PNTS | 10 PNTS | FROM: 03 THRU: 05 | | | | | |
| --MAR-- | --APR-- | --MAY-- | | | | | TOTAL | NO OF | POINT | |
| STD ACT VL | ACT VL | AC VL | ACT VL | ACT VL | ACT VL | | POINTS | MONTHS | AVERAGE | |
| 1. 7 4 | | | | | | | 4 | 1 | 4.0 | |
| 2. 1250 5 | | | | | | | 5 | 1 | 5.0 | |
| 3. 62% 8 | | | | | | | 8 | 1 | 8.0 | |
| 4. 17% 10 | | | | | | | 10 | 1 | 10.0 | |
| 5. | | | | | | | | | | |
| 6. | | | | | | | | | | |
| 7. | | | | | | | | | | |
| 8. | | | | | | | | | | |
| 9. | | | | | | | | | | |
| 10. | | | | | | | | | | |
| TOTAL | | | | | | | | | | |
| ITEMS | | | | | | | | | | |
| SCORE | | | | | | | | | | |

FIGURE 3

```
                    APPRAISAL SUMMARY ENTRY
          ┌─────PERFORMANCE APPRAISAL SUMMARY -- FIRST 1/2─────┐
  DAVID PARK                  YEAR 1997          FROM MONTH:03 THRU MONTH:04
  FACTORS            DEFINITIONS                    SCORE COMMENTS
  ─────────────────────────────────────────────────────────────────────────
  Job and Technical  1. Knows all aspects of job       [A]
  Knowledge          2. Adheres to policies and standards  A Administrative     1. Planning and organization       AA
                     2. Accuracy of paperwork            A
                     3. Forecasting and executing        A
                     4. Proper use of Standards System   O Leadership Skills  1. Utilization of team concept      A
                     2. Clarity of assignments           A
                     3. Solves employee problems quickly NA
                     4. Respected by peers               A Problem Solving    1. Identifies problems early        U
                     2. Solves problems logically        BA
                     3. Displays creative thinking       A Not_Appl    Unsatis    Below_Avg    Average    Above_Avg    Outstanding Browse with arrow keys. <ENTER> to select.
```

```
                    APPRAISAL SUMMARY ENTRY
                    ┌─── OVERALL SUMMARY ───┐
  DAVID PARK                  YEAR 1997          FROM MONTH:03 THRU MONTH:04
  FACTORS            DEFINITIONS                    SCORE COMMENTS
  ─────────────────────────────────────────────────────────────────────────

STANDARDS YTD Score:  5.60            STANDARDS SUMMARY:  Below Expected
```

```
                    APPRAISAL SUMMARY ENTRY
                    ┌─── SUPERVISOR REMARKS ───┐
  DAVID PARK                  YEAR 1997          FROM MONTH:03 THRU MONTH:04
     □
```

```
                    APPRAISAL SUMMARY ENTRY
                    ┌─── EMPLOYEE REMARKS ───┐
  DAVID PARK                  YEAR 1997          FROM MONTH:03 THRU MONTH:04
     □
```

FIGURE 6

| 1ST TEAM MEMBER | | 2ND TEAM MEMBER | |
|---|---|---|---|
| Name: David Park | | Name: Jaime Mayorga | |
| Title: Salesperson | | Title: Salesperson | |
| Birthday: 12-07-52 Hire: | 04-25-92 | Birthday: 04-07-66 Hire: | 04-25-92 |
| Energy: 65.00 Review: | 05-31-97 | Energy: 80.00 Review: | 05-31-97 |
| DOM: 1.50 | * | DOM: 0.75 | * |
| Emp: -0.15 | * | Emp: -0.50 | * |
| Pat: -0.75 | * | Pat: -0.50 | * |
| Dtl: 0.00 | * | Dtl: 0.65 | * |
| Standards Mo: 6.5 YTD: | 7.2 CLSD | Standards Mo: 7.3 YTD: | 6.2 CLSD |
| 3RD TEAM MEMBER | | 4TH TEAM MEMBER | |
| Name: John Taylor | | Name: Sean Kennally | |
| Title: Salesperson | | Title: Salesperson | |
| Birthday: 12-07-52 Hire: | 04-25-92 | Birthday: 04-12-73 Hire: | 03-06-97 |
| Energy: 65.00 Review: | 05-31-97 | Energy: 131.00 Review: | 05-31-97 |
| DOM: 1.50 | * | DOM: 1.50 | * |
| Emp: -0.15 | * | Emp: -0.15 | * |
| Pat: -0.75 | * | Pat: -0.75 | * |
| Dtl: 0.00 | * | Dtl: 0.00 | * |
| Standards Mo: 8.6 YTD: | 5.9 CLSD | Standards Mo: 7.3 YTD: | 7.2 CLSD |

Continue    Print Team    Detail    SuperVisor-Selection    Menu-Return

FIGURE 8

```
                        STANDARDS SET-UP
                     ┌─STANDARDS 1 THRU 5─┐
David Park                 YEAR 1997
   Next Processing Month: 4                  From Month:03 Thru Month:04
     STANDARD              MINIMUM   EXPECTED   OUTSTANDING
---------------------      -------   --------   -----------
1. Achieve sales of        7         10         13
                           units     units      units
2. Achieve combined        1300      1600       1900
   average gross per
   vehicle sold at 3. Achieve F&I             58%       60%        63%
   penetration 4. Achieve closing % to    7%        10%        13%
   total phone calls 5. Achieve QC score of     9.0       9.25       9.50
```

FIGURE 10

```
05/30/97  3:12pm      CREATING/CHANGING ACTIVITIES   et221mnt   v1.0 SYSTEM
                         ┌─DAILY ACTIVITIES─┐
   David Park                              Salesperson
     1. Review day planner vs %       7. Complete housekeeping as
        of objectives                    needed
     2. Work your Daily Work           8. ☐
        Sheet
     3. Change phone mail message      9.

4. Walk lot - know inventory     10.

5. Merchandise lot               11.

6. Review sales board            12.

Daily      Weekly      Monthly     Print      Clone-From      Menu-save
```

FIGURE 11

```
STANDARDS EMPLOYEE CURRENT PROCESSING MONTH

David Park

Number of Months: 12        Emp-No: 00093
                            Std-yr: 1997
From Date: 04-30-97         From-Mo:
Thru Date: 03-31-97         Thru-Mo:
Curr Date:                  Curr-Mo:
```

FIGURE 12

SYSTEM AND METHOD FOR QUANTIFICATION OF HUMAN PERFORMANCE FACTORS

BACKGROUND

1. The Field of the Invention

This invention relates generally to quantifying and modifying a person's ability to perform tasks. More specifically, the system provides a method for the quantification of factors which affect human performance which can then be tracked and modified in accordance with what is learned about the person's performance when quantified, to thereby increase the person's ability to perform the tasks.

2. The State of the Art

The state of the art in job performance appraisal and improvement is typified by highly subjective analysis of performance. After the analysis, vague recommendations for ways to improve are then listed in the hope that somehow making a person aware of their shortcomings will lead to improvement. In other words, many people have had the misfortune to sit through performance appraisals where the only real objective is for management to somehow rank employees so as to be able to compare them to each other, often for the purpose of making such important career decisions such as promotions and bonuses. While comparisons can be useful, they ignore what can be real progress in a person's job performance which might not appear when typically examining the bottom line or some very broad performance criteria. For example, a supervisor will inform a person in some vague manner that job performance is "satisfactory" but that there is still room for improvement. This can be difficult when the person does not have any way to gauge their own performance when there are often many factors which can influence what that performance might be. Alternatively, the supervisor might state that job performance is "below average" but end up giving the same vague advice that the person needs to improve.

A person who is actively seeking for ways to improve might even ask the supervisor specifically how this can be done. The supervisor's reply is typically something along the lines of "develop a winning attitude," "improve communication," "increase business growth," or state that some goal is supposed to be the end result of "trying harder" and "thinking successfully."

The problem with these glittering generalities is that they are all too often accepted without question. Yet they do very little to improve performance, and most likely lead to discontent, confusion, tension, and lack of direction in employees. If performance targets are not specific or measurable, planning and execution of goals break down; evaluation sessions are tense and unproductive. Consequently, disappointment and turnover of employees increases as commitment to company standards falls off.

While the supervisor's task is by no means an easy one, it would be an improvement if a supervisor could identify specific and objective activities for an employee to follow which if performed as instructed, will enable the employee to achieve quantifiable goals. This is especially important when most performance characteristics appear to be subjective in nature. Unfortunately, most supervisors inadvertently become a source of the problem in performance quantification and improvement, instead of a solution. By using vague generalities, no one can disagree with them, but confusion is the result. This is because they are open to any reasonable interpretation.

A standard that lacks clarity and understanding is unmeasurable. Furthermore, a standard that is unmeasurable can't be controlled or achieved. The result is failure for the employee and failure of the business to succeed.

Unfortunately, even if the supervisor successfully identifies objective performance criteria and can even recommend tasks which can be performed to improve job performance, the next difficulty is in tracking the tasks to obtain an overall "picture" of job performance. In other words, even if objective activities have been identified, there is typically no way to track compliance until a sufficient amount of time has elapsed to determine if the end result or bottom line is being improved. Furthermore, keeping track of which objective activities are being performed by which employees to improve particular aspects of job performance becomes an unwieldy task for the supervisor rather quickly. The problem grows exponentially under layers of management.

It would therefore be an improvement over the state of the art to provide a system for enabling identification of performance criteria which are objective activities and standards that are measurable. When tracked, quantifiable standards can lead to improved job performance. This would be accomplished through assigning a particular objective activity to particular employees, tracking which objective activities have been assigned to which employee, and tracking compliance with the objective activities. It would be a further improvement if this could be accomplished using a new method for organizing a plurality of employees under multiple layers of management. This new method should also include the ability to track assignment of and compliance with more subjectively evaluated activities in a same manner as with objectively evaluated activities.

OBJECTS AND SUMMARY OF THE INVENTION

It is an object of the present invention to provide a method and apparatus for identification and tracking of human job performance factors.

It is another object to provide a method and apparatus for quantification of human job performance factors to enable a supervisor to identify problem areas of human job performance.

It is another object to provide a method and apparatus for identification of objective activities which can be performed to thereby improve job performance.

It is another object to provide a method and apparatus for a supervisor to utilize to assign objective activities to employees to thereby improve job performance.

The present invention is realized in a new method and apparatus which enables a supervisor to quantify job performance characteristics. The method accomplishes job performance quantification and tracking of performance by a series of steps. First, the supervisor is provided with an employee problem-solving worksheet on a computer display. The problem-solving worksheet is where the supervisor, together with the employee, identifies objective standards for the employee. These standards are typically all facets of the bottom line goals for the employee. This worksheet forces the employer and the employee to identify exactly what the employee should be accomplishing. Associated with each standard are tasks or activities which are all directed toward helping the employee to at least meet the standard. Therefore, by looking at how close the employee is to meeting the standard, the employee and the employer can determine which activities are most likely to result in the employee at least meeting the standard.

An integral part of the method is a monthly evaluation of each employee with the employee's supervisor. Hard data is entered into the worksheet because the activities are all objective. The standards are also entered, and trends are identified which show whether the employee is moving closer to at least meeting all of the standards. It is also possible to determine trends in activity accomplishment. An employee who is either unwilling or unable to do the assigned activities can also be easily identified.

By tracking the completion of or compliance with the objective activities, it is possible to improve job performance by helping the employee meet the standards. However, it is typical that tracking the objective activities will indicate improvement in job performance long before many standards are met. The bottom line for the employer is that a supervisor is able to make an objective assessment of job performance of all employees.

These and other objects, features, advantages and alternative aspects of the present invention will become apparent to those skilled in the art from a consideration of the following detailed description taken in combination with the accompanying drawings.

BRIEF DESCRIPTION OF THE DRAWINGS

FIG. 3 is a screen snapshot of a standards check-up data entry screen, where the manager enters actual standards results for the immediately completed month.

FIG. 6 is a screen snapshot of a performance appraisal summary data entry screen, where the manager enters a score for each of the items listed under four categories.

FIG. 8 shows in a snapshot of a computer display that when an employee is selected for a detailed view of the information described above, that employee as well as up to three more employees are simultaneously displayed.

FIG. 10 is a snapshot of a computer display which shows an example of a possible standards worksheet.

FIG. 11 is a snapshot of a computer display which shows an example of a possible activity worksheet.

FIG. 12 is a snapshot of a computer display which shows a dialog box which is entitled "Standards Employee Current Processing Center."

DETAILED DESCRIPTION OF THE INVENTION

Figure 1:
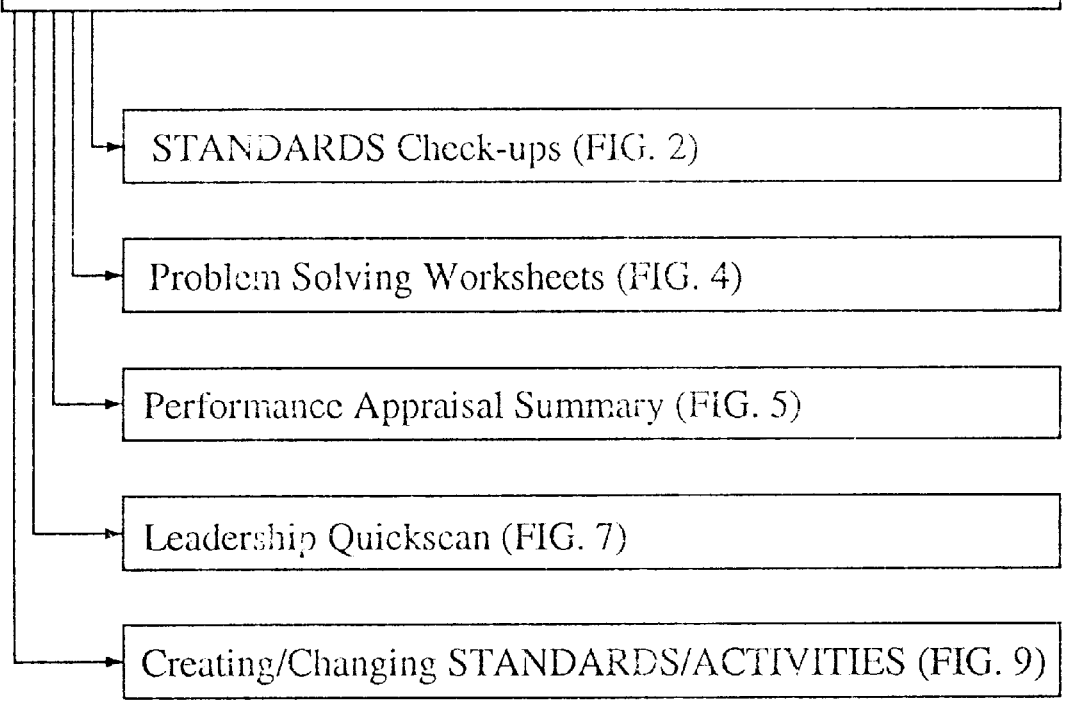
FIG. 1 is a flowchart which shows the presently preferred embodiment as designed in accordance with the principles of the present invention. The flowchart shows a (main) menu of options available at a computer interface from which a user selects a function to perform.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

A brief introduction is useful to the concept of the present invention which has been developed specifically to help people be successful by enabling manager's to manage them effectively. The purpose of the program is to enable a supervisor to manage by objective standards, thereby leaving no excuse for failure if the standard is clearly understood by both an employee and a supervisor.

The model around which the program was developed and which will be described hereinafter is a car dealership, where the employees include salesman, technicians, service advisors, accountants, etc. However, it should be realized that the method of the present invention has far reaching applications to any company, not just a sales oriented business.

In the car dealership model, it will be assumed that a general manager will provide a list of priority standards by which their departments will be measured. While the standards must be quantifiable and objective, the number of standards and how the standards will be measured typically remains to be negotiated between the general manager and the department manager. However, it should always be remembered that the standards must be quantifiable. Once the department managers understand the standards, they can convey these standards to the staff.

Once a standard is understood, it must be broken down into specific tasks that must be accomplished in order to achieve a desired result. In the presently preferred embodiment, these tasks or activities are divided into three categories. These categories are activities which need to be completed on a daily, a weekly and a monthly basis. Obviously, other time divisions can be selected, but most standards can be made to fit these categories.

The purpose of these activities is to replace the antiquated notion of a job description. The activities provide a method to inventory performance. This inventory takes the form of a monthly review of performance. This is a so-called "Check-up from the Neck-up." The information is stored so that an employee's performance can be compared against previous month's performances. If an employee's performance has fallen below minimum acceptable levels, the check-up session immediately becomes a problem solving work session.

A problem solving work session results in the creation of a problem-solving worksheet. It is vital to understand that the problem-solving worksheet not only identifies what steps the employee must take to raise performance above a minimum acceptable standard, it also becomes an inventory of leadership. This is because it enables a general manager to determine what steps a department manager (supervisor) is taking to rectify a problem with an employee.

However, before an employee who is struggling can be helped, the first step in the process is the identification of standards. Standards must be quantified. The more concrete the information a manger provides, the more likely there will be a meeting of the minds between the manager and the staff.

Ideally, each standard is clearly stated and begins with an action word so as to direct behavior toward meeting the standard. Meeting the standard is most easily thought of as being one of three categories, though there are obviously degrees between them. The three categories or standard levels of achievement are minimum acceptable results, expected results and outstanding results. Performance is scored at the end of each month, clearly indicating if a trend is positive or negative.

It should be apparent that this method does not alleviate a manager's responsibility to critique the staff. On the contrary, the responsibility is emphasized. However, the method enables scoring of an employee objectively and fairly. But it should be remembered that the goal is to build confidence as success is noted, even if gradual.

The function of a problem-solving worksheet is to help an employee and a manager to identify a problem. It might be that the standard was poorly communicated, the activity was not understood, or a person's belief system impeded performance. Whatever the cause, it must be found. Therefore, as progress is reviewed in a check-up each month, it might be found that some standards have not been met, while others have been exceeded by a wide margin. In both cases, the employee and the manager need to spend time reviewing the standards. This is because there may be several reasons why performance is better or worse than expected.

For example, the standard may itself be faulty. This may be particularly so the first few times that the method of the present invention is followed. It typically takes experience to create quantifiable and objective standards that are both reasonable and challenging to an employee. Standards must therefore be renegotiated periodically.

It is also possible that a situation may be out of the employee's control. A serious illness, for example, could have a temporary negative impact on achieved results. In this case, the standard might not need adjusting, but the rating might be adjusted accordingly.

It is also possible that an employee may not perform satisfactorily. Here, the manager must work with the employee to get performance back on track.

It should be observed that the method is not designed to punish poor performance, but to find ways to improve it. This is because the philosophy behind the present invention is that the most precious resource we have is people. Turnover of key people leads to many undesirable results, such as low morale which drags down everyone in a business. Furthermore, turnover costs money.

It is noted that two of the most common reasons for turnover are (1) that the employee did not know what was expected, and (2) the employee did not know what the boss thought of the employee. The method of the present invention eliminates both of these concerns.

The present invention has been implemented as a software program running on a general purpose computer. The operating system used is Unix, but it should be realized that it is not a limiting factor. Any appropriate operating system which can execute the program can be used.

FIG. 1 is a flowchart which shows the presently preferred embodiment as designed in accordance with the principles of the present invention. The flowchart shows a menu of options available at a computer interface from which a user selects a function to perform. The options include, but are not necessarily limited to (1) creating and/or changing standards and/or activities, (2) performing a standards check-up, (3) creating problem solving worksheets, (4) displaying an organizational chart overview, and (5) displaying a performance appraisal summary. Other items can be part of the menu, such as printing worksheets, standards, etc. However, the five menu options above are the most useful to the user.

It will be assumed that the user is not using the system for the first time. Accordingly, the database of employees and supervisors has already been created. Furthermore, it is assumed that standards have already been created. How these two particular functions are executed will be explained when the appropriate menu option is selected.

Figure 2:
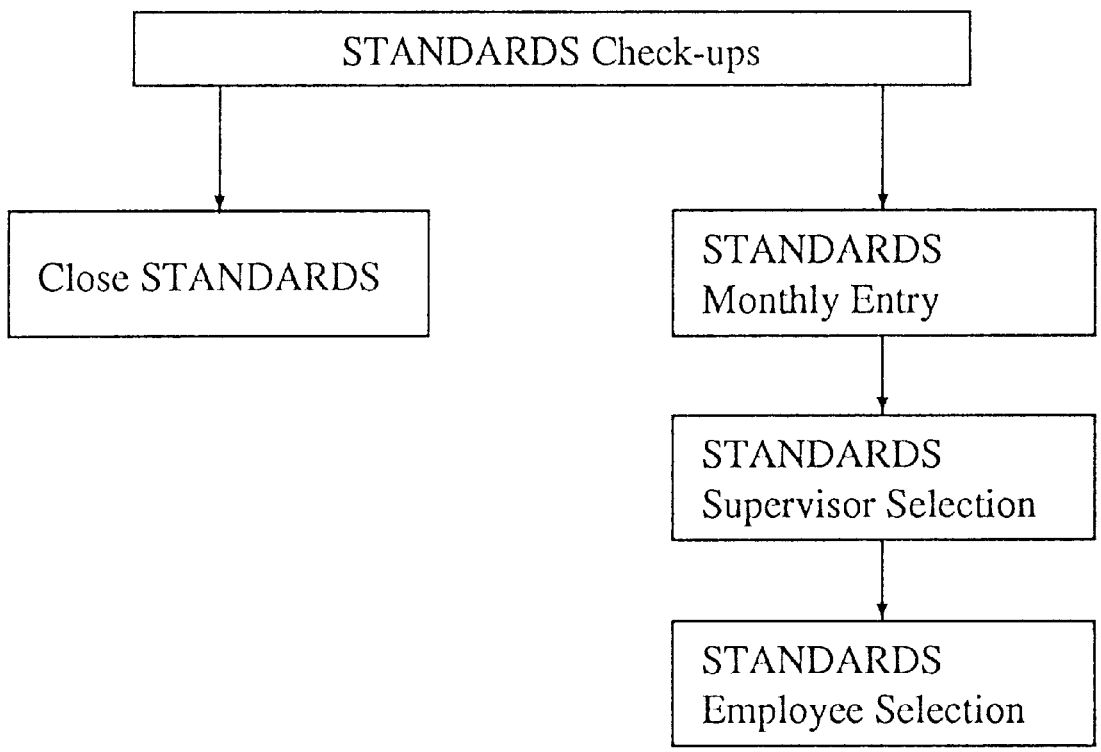
FIG. 2 is a flowchart of a first selectable option in the menu of FIG. 1, and is directed towards an evaluation of the employee relative to standards information which is input to a computer database.

FIG. 2 is a flowchart of a (first) selectable option in the menu of FIG. 1. This menu option is directed towards an evaluation of the employee relative to standards information which is input to the computer database at this time. This information is typically entered by the manager who is assumed to be the user of the program at this time. However, it should be remembered that this menu option is only selected when the employee is present and undergoing the monthly review. When the review is complete, the employee is asked by the system to enter the employee's password, thereby assuring that the employee was present during the review.

The first step is to select the option to enter monthly standards information. The next step is to select the current manager's name from among a list of managers if there is more than one. The next step is to browse, using a mouse or curser keys, among the names of the employees over who the manager is responsible, and select the employee whose standards information is to be entered. Standards information is displayed relative to the time that check-ups have occurred. It is presently possible to display up to six months of standards information at a time. Since no more than a year is typically relevant, the only options are to display the first six month period of the current check-up cycle (year), or the second six month period.

FIG. 3 is a screen snapshot which shows that the standards are referred to by number. As explained previously, it is advantageous to keep the standards limited to at most ten in number. FIG. 3 shows that there are two columns for each month. The first column is the actual result that the manager is supposed to enter. The second column is a point value for each standard.

It is presently necessary to proceed through each entry in order to save them. Editing is accomplished after all the values are entered and then by answering "No" to the question, "Do you wish to continue now?" By re-entering the program, it is possible to edit the entries.

Upon completion of entry of the standards information, the system determines whether a problem solving work session is required. If all of the standards are above a minimum acceptable score, the system displays a banner congratulating the employee. However, if one or more standards are noted as being less than the minimum acceptable standard, a problem solving work session is automatically required to complete the check-up.

For each standard requiring problem solving, the system guides the manager through the following free-hand entry field: situation; reason for situation; action steps; and, by whom/when. In the "Situation" section, the manager types a summary of what happened (i.e. the actual result obtained) versus the standard. After a dialogue between the manager and the employee, the "Reason for Situation" section is filled in by the manager. In the "Action Steps" section, the manager fills in what action was agreed upon to be taken to ensure that the standard is met in the future. It is important to state what process will be improved and how the improvement will occur. In the "By Whom\When" section, the name of who is involved in the action steps is entered, as well as a specific date, or dates, for follow-up.

After all standards receiving an unacceptable rating are processed as explained above, the manager now has the choice to close the standards for the employee. Closing the standards requires that the employee enter the employee's password, as an acknowledgement and assurance that the employee was present during "Check-up from the Neck-up."

After all employees under each supervisor have been processed through the check-up and it is the last day of the month, in the preferred embodiment, the month is closed out and the system is prepared for the next month. After closing a month, it is no longer possible to use the system to browse through a past month's results. Therefore, a month is left open for browsing and review until a next processing month begins. After that time, the manager or employee must then refer to a hardcopy if necessary.

Figure 4:
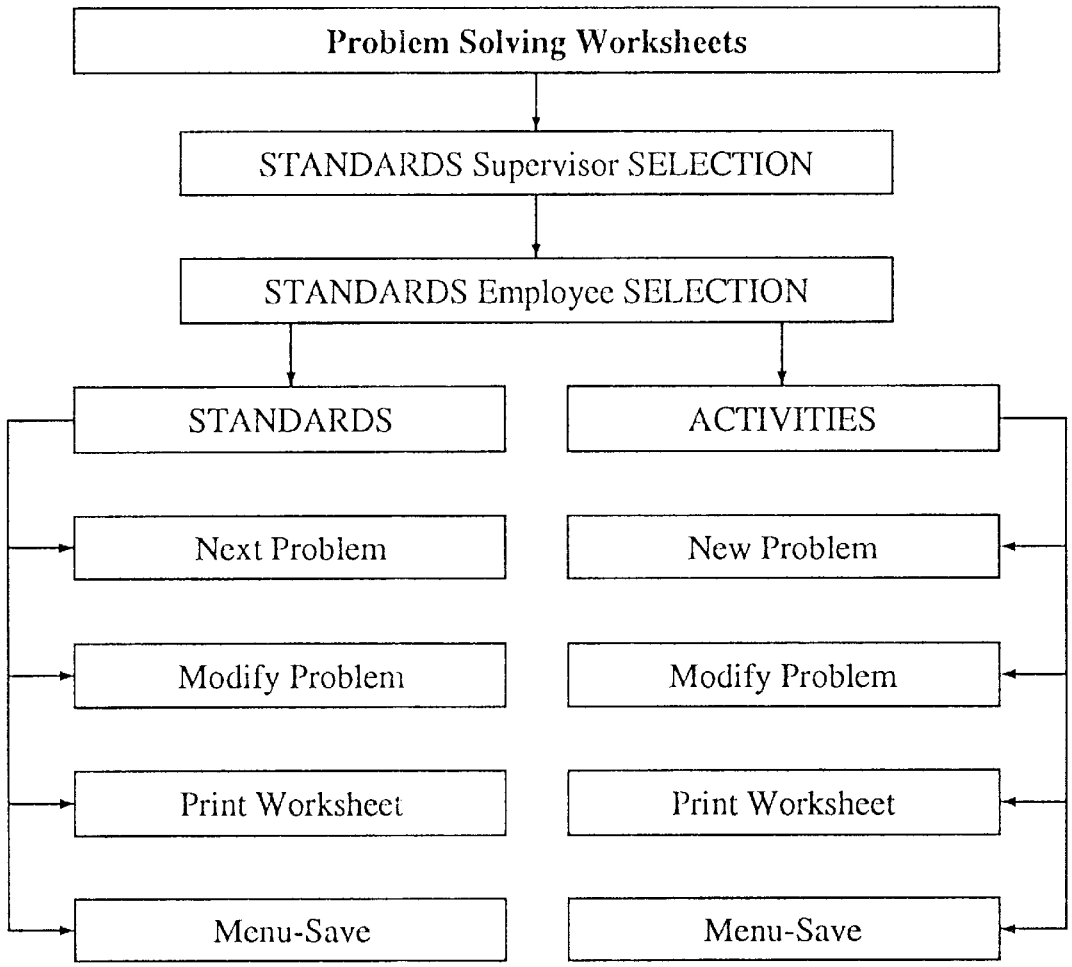
FIG. 4 is a flowchart of a second selectable option in the menu of FIG. 1, and is directed towards the creation and modification of problem-solving worksheets for standards or activities.

FIG. 4 is a flowchart of a second selectable option in the menu of FIG. 1. The menu option is directed towards the creation and modification of problem-solving worksheets for standards or activities. It should be remembered that a modification can only be made to a worksheet in progress. If the employee has closed the check-up session by entering the employee's password, no modification is possible through this menu option. Re-access requires that the system administrator enable this menu item.

After the menu option is selected, the manager is requested to select the manager's name from a displayed list, and then to select the name of the employee for whom the worksheet is being created. At this point, the manager must select whether to browse the employee's standards or to create an activity problem solving worksheet.

If the manager chooses to browse through the employee's standards, the menu options provided at the interface in this preferred embodiment are to (1) move to a next problem, (2) modify an existing problem, (3) print the worksheet, and (4) save the standards and quit to the previous menu.

If the manager chooses to create the problem solving worksheet, then the menu options provided by the interface are to (1) create a problem solving worksheet for a new problem, (2) modify an existing problem, (3) print the problem-solving worksheet, and (4) save the problem-solving worksheets and quit to the previous menu.

When a problem-solving worksheet is created, it should be remembered that in most cases it will be applied to standards. Accordingly, the problem-solving work session may also become necessary on a daily, weekly or monthly basis.

If the manager selects the menu option to create a problem-solving worksheet, the system guides the manager through the following free-hand entry fields: situation; reason for situation; action steps; and by whom/when. When these entry fields are filled in as indicated previously, the employee and the manager have a record of the activity that has been agreed upon that will bring the standard to an acceptable rating. Furthermore, the manager's boss now has a way to track the leadership of his manager by exploring what steps the manager is taking to correct the problem. Therefore, even though accountability is increased, it does not have to be feared. This is because the activities which will result in attaining an acceptable rating for the standards are set out clearly and understood by all concerned.

It is also noted that problem solving sessions are typically the result of an unacceptable standards rating. However, it is also the case that it may be desirable to create a problem-solving worksheet as a result of poor performance of a daily, weekly or monthly activity. Accordingly, the system is designed to enable the manager to create a new problem-solving worksheet with an activity which is designed to improve performance of an existing standard, or daily, weekly or monthly activity.

Figure 5:
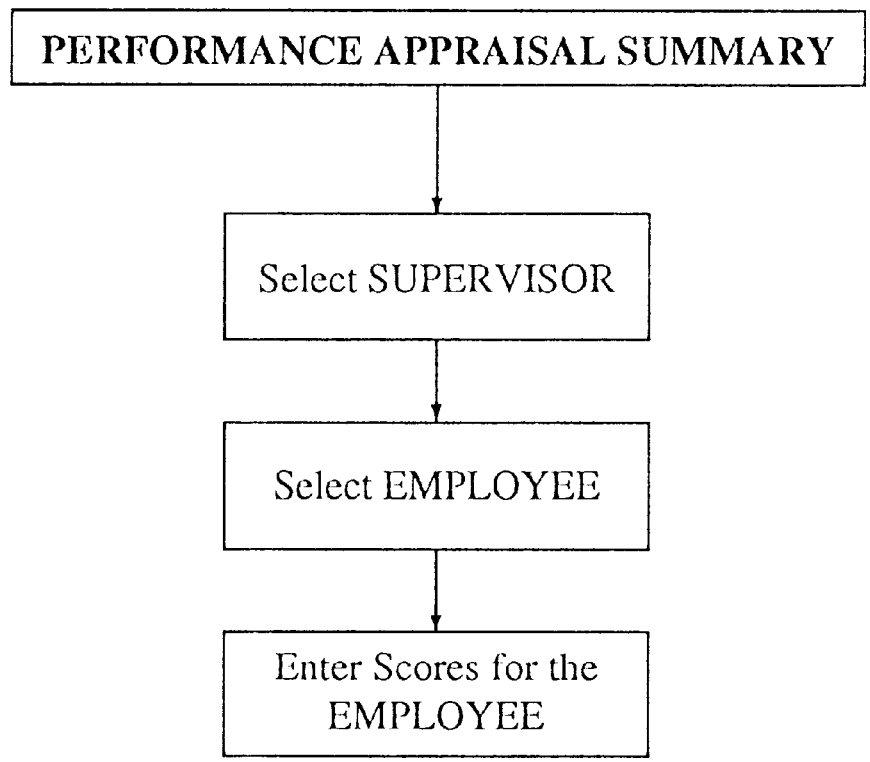
FIG. 5 is a flowchart of a third selectable option in the menu of FIG. 1, and is directed towards the calculation and display of a performance appraisal summary for an employee relative to a selectable time frame.

FIG. 5 is a flowchart of the third selectable option in the menu of FIG. 1. The menu option is directed towards the calculation and display of a performance appraisal summary for an employee relative to a selectable time frame. Typically, the time frame is at the end of a current year.

The performance appraisal summary enables a manager to share perceptions of the employee. Accordingly, it should be realized that this is a more subjective analysis. But even getting subjective feedback can be useful. It enables an employee to understand how others perceive the employee's abilities. Furthermore, it addresses the second most frequent reason given for high employee turnover.

The performance appraisal summary is automatically generated by the system for the manager to fill in after a cycle is completed. In this way, no one is forgotten when it comes time for a review. The month before the normally scheduled review, two blank copies of the summary will be printed during the normal "Check-up from the Neck-up" review session. The blank copies are distributed to the manager and the employee. Both parties write down their own perceptions of the employee's performance. The following month, when the performance appraisal actually occurs, the hand written summaries serve to open a dialogue between the manager and the employee. If differences occur, both parties should be open for dialogue. The manager's perceptions may or may not change as a result of the dialogue. However, the employee's input is not only valued and needed, it lets the employee know that there is a forum for discussion.

It is noted that it is not necessary to wait a full year for the performance appraisal review to take place. The system can be forced to start the process at will from the main menu.

There are two types of performance appraisal summaries, a normal one and one which is associated with a warning notice. Both the normal performance appraisal review and the warning notice rates an employee according to four different categories: job and technical knowledge; administrative; leadership skills; and problem solving. However, the warning notice printout indicates that it is a warning notice.

FIG. 6 is a snapshot of a computer display showing the performance appraisal summary of the presently preferred embodiment. It should be realized that the categories and specific items scored can be modified to suit the particular job for which an employee is being evaluated. However, the default categories and items selected are typically broad enough so that they can be applicable to almost any occupation.

Regarding the category of job and technical knowledge, the items that are scored are (1) Knows all aspects of the job, and (2) Adheres to policies and standards. Regarding the category of administrative, the items that are scored are (1) Planning and organization, (2) Accuracy of paperwork, (3) Forecasting and executing, and (4) Proper use of standards system. Regarding the category of leadership skills, the items that are scored are (1) Utilization of team concept, (2) Clarity of assignments, (3) Solves employee problems quickly, and (4) Respected by peers. Regarding the category of problem solving, the items that are scored are (1) Identifies problems early, (2) Solves problems logically, and (3) Displays creative thinking.

The possible scores for the items described above are Not-Applicable, Unsatisfactory, Below Average, Above Average, and Outstanding. Once a score has been highlighted for an item, it is recorded. During scoring, it is also possible to type in any applicable comments for each of the four categories. After scoring is complete, a summary score is provided which is an average of all the scores entered during the appraisal, with all items weighted equally. It is then possible to make additional comments regarding the averaged score. The system will also provide an overall summary of the employee's professional development, the year-to-date standards (check-up score), and a combined summary of the check-up scores. Finally, the employee and the manager are both given the opportunity to make any last comments which are then recorded. Any section of the performance appraisal can then be edited by either the manager or the employee.

At the end of the performance appraisal summary session, the manager is prompted to select a new review period. This is done by entering the number of months that are to pass before the next formal review is to be completed.

Figure 7:
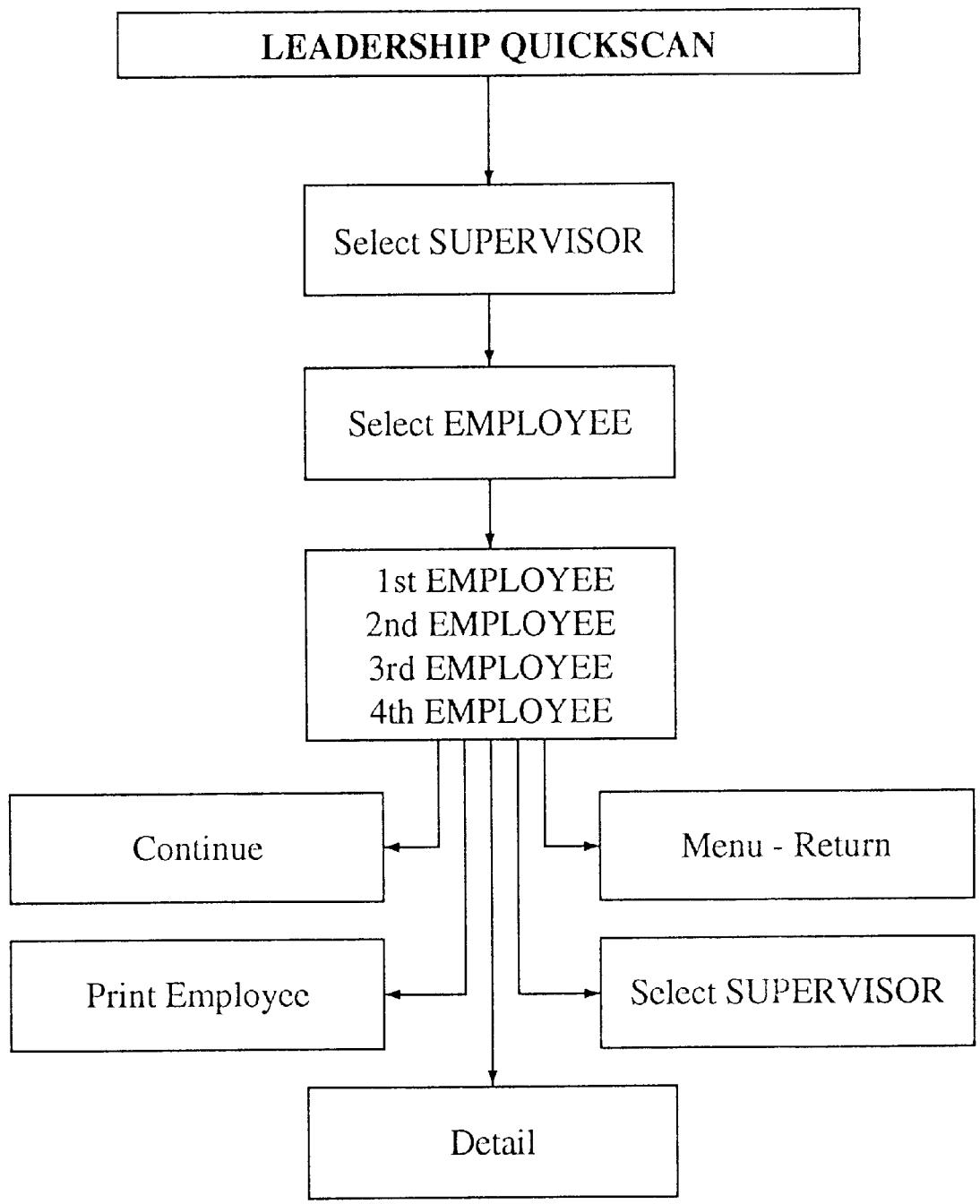
FIG. 7 is a flowchart of the fifth selectable option (Leadership Quickscan) in the main menu of FIG. 1. The menu option is directed towards administrative tasks for controlling the computer database which organizes employees and supervisors into departments, thereby allowing the organizational structure of a company to be viewed at a glance.

FIG. 7 is a flowchart of the fifth selectable option (Leadership Quickscan) in the menu of FIG. 1. The menu option is directed towards administrative tasks for controlling the computer database which organizes employees and supervisors into departments, thereby allowing the organizational structure of a company to be viewed at a glance.

By selecting this option, a manager can view a performance summary for all employees in any selected department. The manager's password only enables viewing of performance summaries for employees within the manager's department. However, the manager can also pull up detail of any employee's standards, problem-solving worksheets and performance appraisals.

The process for examining the organizational chart showing the structure of a company in terms of employees is much the same as for other menu options. Specifically, a supervisor is first selected. At this point, the user can see all employees who are currently managed by that supervisor. The user then has the option of selecting one employee. Standards information for that employee is then displayed on the screen. In the presently preferred embodiment, the system takes advantage of the remaining space on the display be showing the standards for three other employees who are also managed by the same supervisor. The user is then able to quickly scan through all of the employees under that supervisor. The user can print information being displayed, continue on to other employees, return to a previous menu, see more detail about a specific employee, or select another supervisor to view the associated list of employees who are being managed.

FIG. 8 shows in a snapshot of a computer display that when an employee is selected for a detailed view of the information described above, that employee as well as up to three more employees are simultaneously displayed. In this presently preferred embodiment, the employee's name, job title, birth date and hire date are displayed on the first three lines. The employee's next performance appraisal summary date is displayed in the fourth line. The bottom line displays the most recent score for the employee's check-up, the year-to-date average score, and the current status (current or closed).

The options available to the manager are then to continue on to another group of employees, print the charts for the entire department, look at the employee in detail, return to the supervisor selection menu, or return to the main menu.

Figure 9:
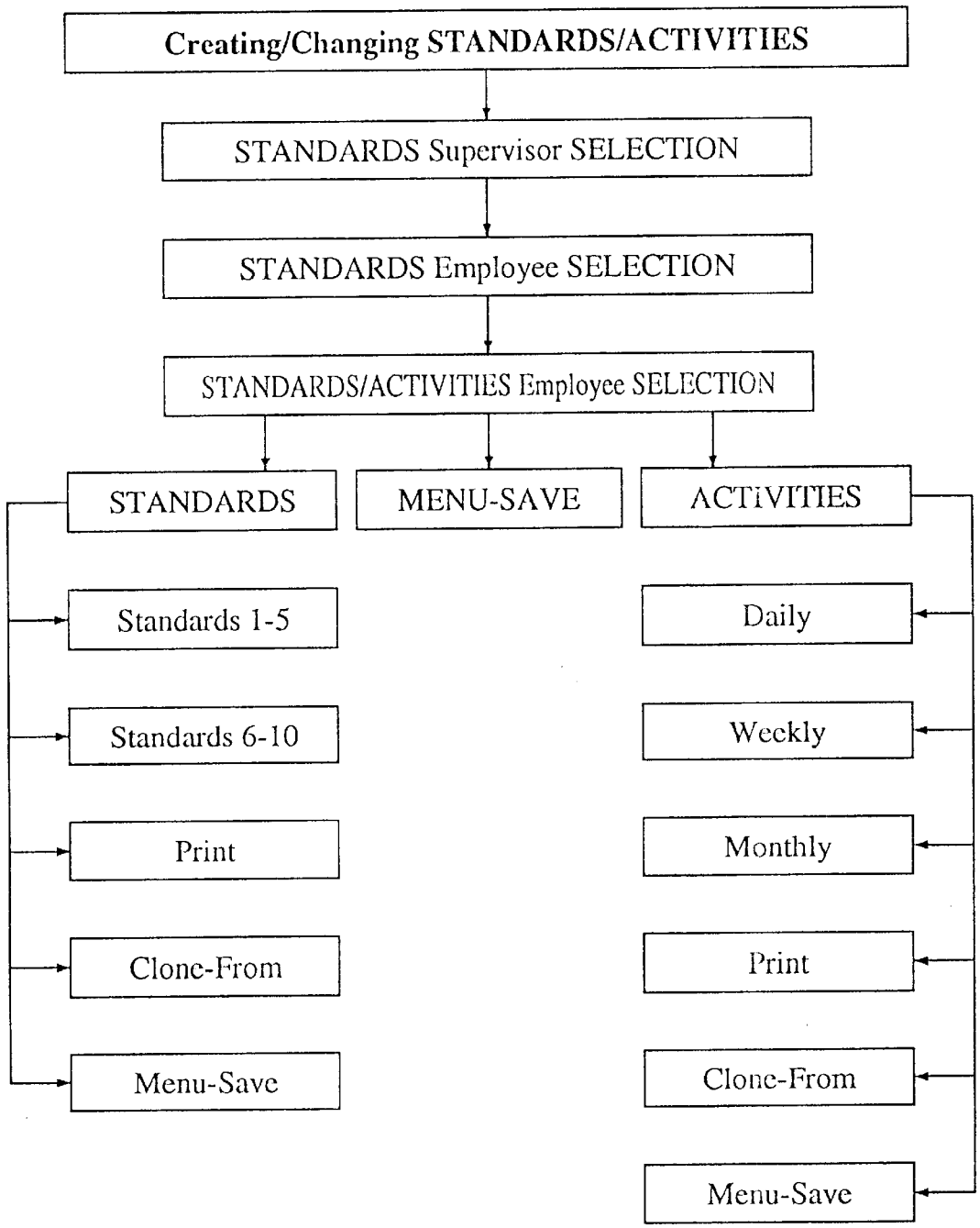
FIG. 9 is a flowchart of a sixth selectable option in the menu of FIG. 1, and is directed towards the creation and modification of standards (and activities) by which the employee is evaluated.

FIG. 9 is a flowchart of a sixth selectable option in the menu of FIG. 1, and is directed towards the creation and modification of standards (and activities) by which the employee is evaluated. The first step is to select the manager, then select an employee who is supervised by that manager. The manager is then given three options: go to standards, go to activities, or go to save and quit the main menu.

If the manager selects to change or create standards or activities, the manager can choose to create standards or activities from scratch, or may choose to set-up standards or activities for an employee by cloning the standards and/or activities from an existing employee.

In this preferred embodiment, it is possible to view five standards at a time, and up to a total of ten different standards. FIG. 10 is a snapshot of a computer display which shows an example of a possible standards worksheet. The manager fills in three columns for each standard. The three columns show a minimum standard, an expected standard, and an outstanding standard result. After repeating the process for up to the next five standards (for a total of ten at most), the manager is given the option to print the standards, to copy the standards to another employee, or save information and quit to the main menu.

In contrast to the standards worksheets, creating an activity worksheet allows the manager to select daily activities, weekly activities or monthly activities. FIG. 11 is provided as a snapshot of a computer display showing a daily activities worksheet.

Once the activities worksheets are complete, the manager can then exercise the option to print the worksheets, to copy the activities worksheets to another employee, or save information and quit to the main menu.

Advantageously, the activities worksheets are conveniently printable in a format suitable for insertion into a day planner. The system thus provides a method for the user to integrate the printouts from the system with the organizational convenience of day planners.

The description above has always assumed that the employee for which the activity revolved around was already in existence within the database. However, first time setup or initialization of the system involves several steps. Before setting up a new employee, it is required that the manager first contact the system administrator. The system administrator adds the new employee by entering personal data (i.e. title, hire date, and birth date). The system administrator will also obtain a login ID and password from the system for use by the new employee.

When creating standards for this new employee, a dialog box is provided which is entitled "Standards Employee Current Processing Center," as shown in the snapshot of the computer display in FIG. 12. The number of months field refers to the number of months that any standards will apply to the employee, and indicates when the annual performance appraisal will be scheduled to pop-up on the screen. This number is most often left as a 12 for 12 months. However, if the employee is probationary, this number might be made a 3. It might also be advantageous to select a period of only 6 months for employees involved in sales.

A final main menu option which can be provided is a special events report. For example, the special events might be a printout of all birthdays, hire date anniversary, and reviews.

Figure 13:
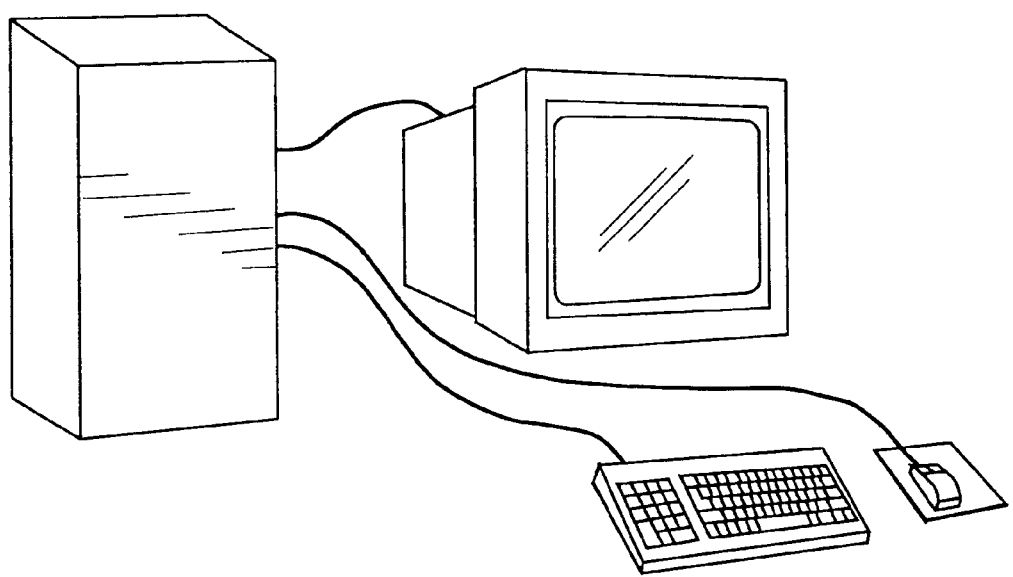
FIG. 13 is a perspective illustration of a typical computer system or workstation which is capable of implementing the presently preferred embodiment of the present invention.

FIG. 13 is an illustration of a computer system which is capable of implementing the presently preferred embodiment of the present invention. The system can be a stand alone personal computer, or be implemented on a computer network.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for utilizing a computer system for measuring and improving an employee's job performance through identification and monitoring of at least one quantifiable and objective standard by assigning at least one quantifiable and objective activity to the employee and storing the at least one quantifiable and objective activity in the computer system, wherein the at least one quantifiable and objective activity is designed to enable the employee to at least meet the at least one quantifiable and objective standard and to record success or failure in the computer system, said method comprising the steps of:
   (1) identifying and recording in the computer system the job performance which is to be measured and improved;
   (2) identifying and recording in the computer system the at least one quantifiable and objective standard which is determined to be at least a partial measure of the job performance;
   (3) determining if the employee needs to improve performance of the at least one quantifiable and objective standard by the steps of:
      (a) assigning in the computer system a rating scale to the at least one quantifiable and objective standard, wherein the rating scale has at opposite ends an acceptable rating value and an unacceptable rating value, and
      (b) utilizing the rating scale to determine where the employee's performance stands in relation to the at least one quantifiable and objective standard by assigning and recording in the computer system a rating value;
   (4) identifying and assigning the at least one quantifiable and objective activity to the employee if the employee receives at least a partially unacceptable rating relative to the at least one quantifiable and objective standard;
   (5) periodically determining whether the employee's job performance is improving as determined by an updated rating of the at least one quantifiable and objective standard as recorded in the computer system;
   (6) re-evaluating the at least one quantifiable and objective standard whenever the at least one quantifiable and objective standard is not being achieved;
   (7) replacing the at least one quantifiable and objective standard with at least one new quantifiable and objective standard which is selected to thereby improve performance in a skill area which is similar to that of the at least one quantifiable and objective standard.

2. The method as defined in claim 1 wherein the method further comprises the step of receiving input from the employee and a supervisor as to what the at least one new quantifiable and objective standard should be.

3. The method as defined in claim 1 wherein the method of identifying the at least one quantifiable and objective standard which is determined to be at least a partial measure of the job performance further comprises the step of receiving input from the employee and a supervisor of the employee.

4. The method as defined in claim 1 wherein the step of identifying and assigning the at least one quantifiable and objective activity to the employee further comprises the step of selecting an activity which can be objectively monitored.

5. The method as defined in claim 4 wherein the method further comprises the step of making the at least one quantifiable and objective activity a discrete activity, the performance of which is counted as a successful result, and the non-performance of which is counted as an unsuccessful result.

6. The method as defined in claim 5 wherein the method further comprises requiring a specific percentage of successful results in performance of the at least one quantifiable and objective activity for the employee to be given a successful completion status for the at least one quantifiable and objective activity.

7. The method as defined in claim 6 wherein the step of periodically determining whether the employee's job performance is improving as determined by an updated rating of the at least one quantifiable and objective standard further comprises the step of having a monthly review with the employee and a supervisor.

8. The method as defined in claim 1 wherein the step of assigning a rating scale to the at least one quantifiable and objective standard, wherein the rating scale has at opposite ends an acceptable rating value and an unacceptable rating value, further comprises the step of creating a scale having at least three rating values.

9. The method as defined in claim 8 wherein the step of creating a scale having at least three rating values further comprises the step of assigning the at least three rating values to be: (1) exceeds the standard, (2) meets the standard, and (3) below the standard.

10. The method as defined in claim 8 wherein the step of creating a scale having at least three rating values further comprises the step of assigning the at least three rating values to be real number values.

11. The method as defined in claim 1 wherein the method further comprises the step of creating a database of objective standards from which the at least one quantifiable and objective standard is selected.

12. The method as defined in claim 1 wherein the method further comprises the step of creating a database in a computer system, wherein the database contains the at least one quantifiable and objective standard and at least one quantifiable and objective activity which is associated with the at least one quantifiable and objective standard, for each employee whose job performance is being monitored.

13. The method as defined in claim 12 wherein the method further comprises the step of limiting a total number quantifiable and objective standards and a total number of quantifiable and objective activities so as not to overwhelm the employee whose job performance is being monitored, or a supervisor over the employee.

14. The method as defined in claim 13 wherein the total number of quantifiable and objective standards is limited to ten.

15. The method as defined in claim 12 wherein the method further comprises the step of implementing a security system to thereby safeguard job performance information.

16. The method as defined in claim 15 wherein the method of implementing the security system further comprises the steps of:
   (1) assigning a password to each employee whose job performance is being monitored;
   (2) assigning a password to each supervisor; and
   (3) requiring the employee's password and the supervisor's password to view or modify job performance information.

17. The method as defined in claim 12 wherein the method further comprises the step of providing an interface to the database, wherein the interface provides a user with the ability to:
  (1) create or change the at least one quantifiable and objective standard and the at least one quantifiable and objective activity for the employee;
  (2) evaluate information relative to the at least one quantifiable and objective standard for the employee; and
  (3) create a problem-solving worksheet for the employee.

18. The method as defined in claim 17 wherein the step of providing the interface further comprises the step of providing the user with the ability to calculate a performance appraisal summary for the employee.

19. The method as defined in claim 18 wherein the step of calculating a performance appraisal summary for the employee further comprises the step of providing job performance information for a selected employee for a selected period of time.

20. The method as defined in claim 17 wherein the step of providing the interface further comprises the step of providing the user with the ability to obtain an hierarchical organizational chart of all personnel.

21. The method as defined in claim 20 wherein the step of providing the interface further comprises the step of providing the user with the ability to obtain an organization chart of personnel which shows any hierarchical relationships between the personnel.

22. The method as defined in claim 20 wherein the step of providing the interface further comprises the step of providing the user with the ability to:
  (1) rearrange departments;
  (2) add or delete employees;
  (3) view any single department; and
  (4) control changes to the database.

23. The method as defined in claim 17 wherein the step of providing the interface to enable the user to create or change the at least one quantifiable and objective standard and the at least one quantifiable and objective activity for the employee further comprises the steps of:
  (1) selecting a supervisor;
  (2) selecting an employee who is supervised by the supervisor; and
  (3) choosing whether to create or change the at least one quantifiable and objective standard, or the at least one quantifiable and objective activity.

24. The method as defined in claim 23 wherein the step of providing the interface further comprises the steps of:
  (1) selecting to return to a main menu; and
  (2) selecting to save the at least one quantifiable and objective standard and the at least one quantifiable and objective activity.

25. The method as defined in claim 23 wherein the step of choosing whether to create or change the at least one quantifiable and objective standard, or the at least one quantifiable and objective activity further comprises the step of providing an interface with the following options when the user chooses to create or change the at least one quantifiable and objective standard:
  (1) view all of the quantifiable and objective standards;
  (2) print all of the quantifiable and objective standards;
  (3) create a copy of all the quantifiable and objective standards under a name of a different employee; and
  (4) save the quantifiable and objective standards and return to a main menu.

26. The method as defined in claim 23 wherein the step of choosing whether to create or change the at least one quantifiable and objective standard, or the at least one quantifiable and objective activity further comprises the step of providing an interface with the following options when the user chooses to create or change the at least one quantifiable and objective activity:
  (1) view all the quantifiable and objective activities which are to be accomplished daily;
  (2) view all the quantifiable and objective activities which are to be accomplished weekly;
  (3) view all the quantifiable and objective activities which are to be accomplished monthly;
  (4) print all of the quantifiable and objective activities;
  (5) create a copy of all the quantifiable and objective activities under a name of a different employee; and
  (6) save the quantifiable and objective standards and return to a main menu.

27. The method as defined in claim 17 wherein the step of providing the interface to enable the user to evaluate information relative to the at least one quantifiable and objective standard for the employee further comprises the steps of:
  (1) inputting the quantifiable and objective standards for all employees as obtained from an appropriate source of information;
  (2) selecting a supervisor; and
  (3) select an employee who is supervised by the supervisor.

28. The method as defined in claim 17 wherein the step of providing the interface to enable the user to create a problem-solving worksheet for the employee further comprises the steps of:
  (1) selecting a supervisor;
  (2) select an employee who is supervised by the supervisor; and
  (3) choosing whether to create a problem-solving worksheet when the employee falls below a minimum rating for the quantifiable and objective standard, or when the employee fails to make progress in the quantifiable and objective activity.

29. The method as defined in claim 28 wherein the step of choosing whether to create the problem-solving worksheet when the employee falls below a minimum rating for the quantifiable and objective standard, or when the employee fails to make progress in the quantifiable and objective activity further comprises the step of providing an interface with the following options when the user chooses to create a problem-solving worksheet when the employee falls below a minimum rating for the quantifiable and objective standard:
  (1) identify a problem which needs to be solved and list the problem in the worksheet;
  (2) modify the problem in the worksheet which was identified as needing to be solved;
  (3) print the worksheet describing the identified problem which needs to be solved; and
  (4) save the worksheet showing the identified problem and return to a main menu.

30. The method as defined in claim 28 wherein the step of choosing whether to create the problem-solving worksheet when the employee falls below a minimum rating for the quantifiable and objective standard, or when the employee fails to make progress in the quantifiable and objective activity further comprises the step of providing an interface with the following options when the user chooses to create a problem-solving worksheet when the employee fails to make progress in the quantifiable and objective activity:

(1) identify a problem which needs to be solved and list the problem in the worksheet;

(2) modify the problem in the worksheet which was identified as needing to be solved;

(3) print the worksheet describing the identified problem which needs to be solved; and (4) save the worksheet showing the identified problem and return to a main menu.

31. A method for utilizing a computer system for measuring and improving an employee's job performance through identification and monitoring of at least one standard by assigning at least one activity to the employee, wherein the at least one activity is designed to enable the employee to at least meet the at least one standard, said method comprising the steps of:

(1) identifying and recording the at least one standard in the computer system;

(2) identifying and recording the at least one activity in the computer system; and (3) periodically determining whether the employee is meeting the standard, and if not, modifying in the computer system the at least one activity in a manner which is believed will enable the employee to meet the standard, or add at least another activity which is believed will enable the employee to meet the standard.

* * * * *